Nov. 3, 1959 R. GALIN ET AL 2,911,170
REFRIGERATING APPARATUS
Filed Aug. 6, 1956 2 Sheets-Sheet 2
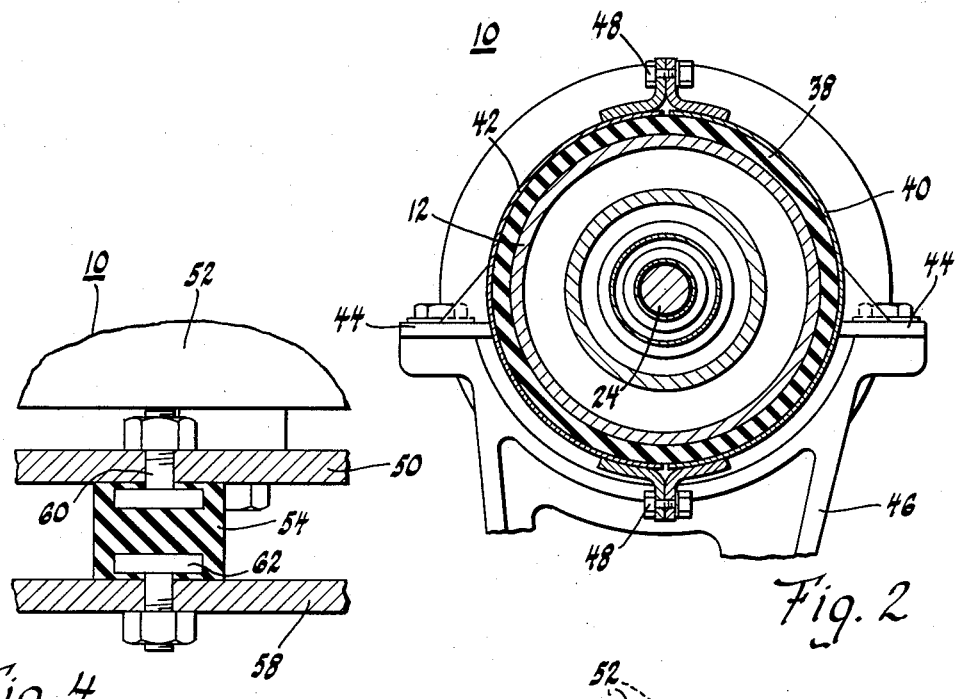
Fig. 2
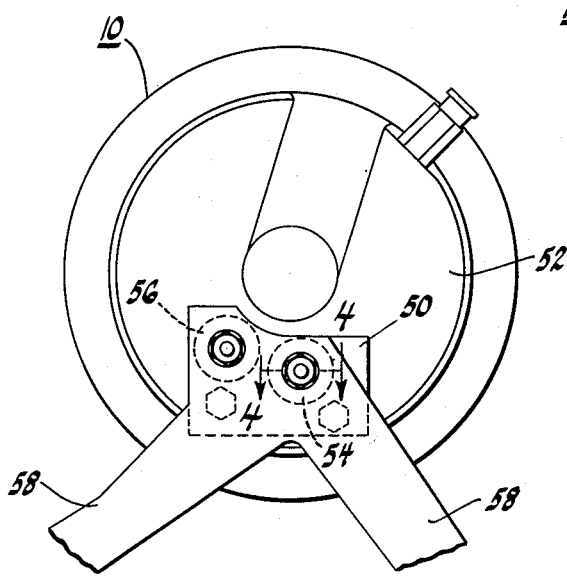
Fig. 4
Fig. 3
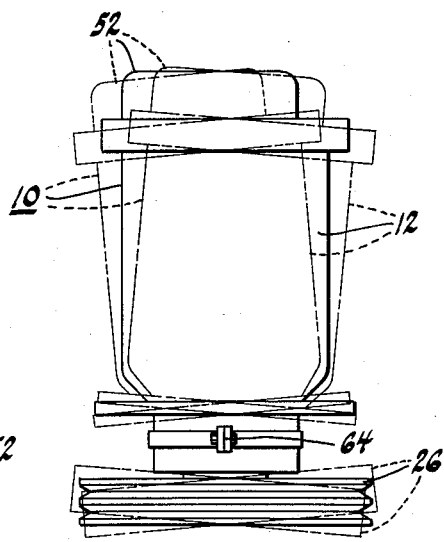
Fig. 5
INVENTORS
ROBERT GALIN
ALLEN L. EVERITT
BY Edwin S. Dybvig
THEIR ATTORNEY

United States Patent Office 2,911,170
Patented Nov. 3, 1959

2,911,170

REFRIGERATING APPARATUS

Robert Galin and Allen L. Everitt, Dayton, Ohio, assignors to General Motors Corporation, Detroit, Mich., a corporation of Delaware Application August 6, 1956, Serial No. 602,343

4 Claims. (Cl. 248—15)

This invention relates to refrigerating apparatus and more particularly to a shock absorbing mounting for an axial type wobble plate refrigerant compressor.

The wobble plate axial type compressor, wherein the rotary motion of a shaft is converted to axial reciprocating motion of one or more pistons generates forces making it difficult to resiliently mount the compressor in relation to a relatively fixed support. The internal forces set up by the unbalance in reciprocating and rotating masses tend to impart a gyratory motion to the compressor such that the opposite ends gyrate 180° out of phase about the center of gravity of the crankshaft of the compressor. On the other hand, the gas forces in the compressor tend to set the compressor in torsional oscillation about the crankshaft axis.

The resilient mounting problem becomes particularly difficult when the compressor is mounted on a car engine or railway vehicle or the like. In such a mounting the compressor is subject to road shock in addition to the internal forces noted above. Moreover, in automobile and railway vehicle installations where the compressor is driven by a pulley and belt, the resilient mounting must be designed so as to maintain belt tension between the driving pulley of the compressor and the pulley connected with a power source.

It is therefore an object of this invention to provide an improved resilient shock absorbing mounting for a rotary machine such as a wobble type compressor or the like.

A more specific object is to provide a shock absorbing mounting for an axial refrigerant compressor of the wobble plate type, wherein the mounting absorbs the gyratory and torsional forces generated by the compressor.

It is still another object to provide a shock absorbing mounting for a compressor of the type having a driving pulley, the mounting being so arranged as to maintain belt tension between the compressor pulley and a pulley driven by a power source.

Further objects and advantages will be apparent from the following description, reference being had to the accompanying drawings, wherein a preferred form of the present invention is clearly shown.

In the drawings:

Figure 2 is a sectional view taken along line 2—2 of Figure 1;

Figure 3 is a left end view of the compressor and mounting therefor shown in Figure 1;

Figure 4 is a sectional view taken along line 4—4 of Figure 3; and

Figure 5 is a pictorial representation of the mode of oscillation of a compressor using a mounting arrangement in accordance with this invention.

Figure 1:
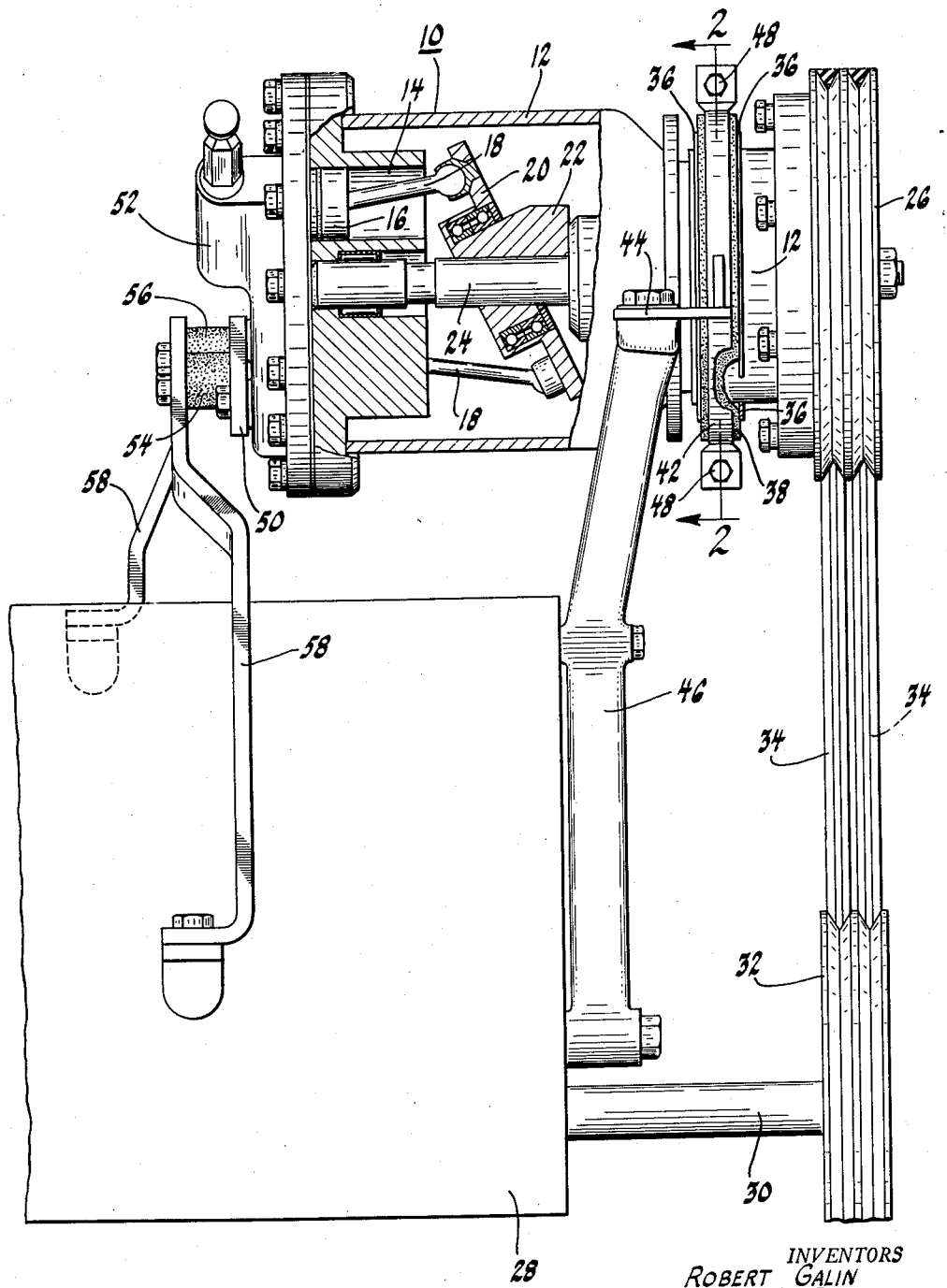
Figure 1 is a side view with parts broken away, showing an arrangement for mounting a wobble plate type refrigerant compressor in fixed relation to an engine of a motor vehicle.

The shock absorbing mounting of this invention is of general application but is particularly adapted for use with an axial compressor of the type shown in Figure 1. As shown in this figure, the compressor generally denoted by reference numeral 10 comprises a main housing 12 formed with cylinder chambers 14. Each cylinder chamber contains a piston 16 that is reciprocable therein, and which is attached to a connecting rod 18. The connecting rods 18 are universally connected to a wobble plate 20 that is driven by a bearing element 22 and drive shaft 24. The drive shaft 24 is suitably connected with a driving pulley 26 located at the end of the compressor assembly. Rotary movement of pulley 26 and shaft 24 is converted to axial reciprocation of pistons 16 by the wobble plate mechanism, as is well known to those skilled in the art.

The compressor 10 preferably forms a component part of a motor vehicle air conditioning system (not shown). The compressor 10 is driven by a motor vehicle engine 28 through drive shaft 30, pulley 32 and V-belts 34. The compressor is resiliently mounted in fixed relation to the motor vehicle and is preferably secured to the motor vehicle engine by the mount-arrangement which will now be described. The portion of the compressor housing 12 adjacent the pulley 26 is provided with a pair of retaining rings 36 that encircle the housing and which are soldered or otherwise suitably secured to the housing. A soft rubber ring 38, as more particularly shown in Figure 2, fits between the retaining rings 36 and engages the housing 12 of the compressor. The retaining rings serve to prevent the rubber ring from moving along the longitudinal axis of the compressor. The compressor housing 12 might also be provided with a circumferentially extending groove as an alternative method of preventing the rubber ring from moving along the longitudinal axis of the compressor. In such an arrangement the rubber ring would fit within the circumferentially extending groove. The rubber ring 38 is held in tight engagement with the compressor housing 12 by means of a pair of semicircular metal clamping rings 40 and 42. Each clamping ring is secured to a flanged portion 44 that is in turn secured to a mounting bracket 46. The semicircular clamping rings 40 and 42 are held together by the nuts and bolts denoted by reference numeral 48. When the fasteners 48 are tightened, the rubber ring 38 is prestressed to a certain predetermined amount. The mounting bracket 46 is preferably attached to a convenient part of the engine 28.

The left end of the compressor as shown in Figure 1 is provided with a metal plate 50 that is bolted to the end plate 52 of the compressor. A pair of rubber cylinders 54 and 56 are interposed between metal plate 50 and mounting bracket 58. The rubber cylinders 54 and 56 are each provided with a pair of flat-headed studs 60 and 62 that have their heads embedded in the rubber cylinders. The studs 60 and 62 are respectively bolted to the metal plate 50 and to the mounting bracket 58. With this arrangement the rubber cylinders 54 and 56 provide a shear type resilient shock absorbing connection between the bracket 58 and the compressor 10. The bracket 58 is preferably secured to some convenient part of the engine 28.

The rubber ring 38 and mounting parts associated therewith provide the primary support for the compressor 10. The rubber ring 38 takes up the torsional oscillation of the compressor and also reduces lateral movement of the compressor. The rubber mounts 54 and 56 are primarily used to take up the transverse movement of the compressor and are made somewhat more resilient than the rubber ring 38 in order to provide greater transverse movement of the end of the compressor opposite the pulley than is afforded by the relatively stiff rubber mounting 38.

The oscillatory movement of the compressor due to the internal forces generated by the compressor is shown in an exaggerated manner in Figure 5. Since the compressor is substantially rigidly fixed at the point where the rubber ring 38 engages the compressor housing, the compressor moves transversely about a transverse axis 64, located intermediate the rubber ring 38 and passing through the compressor. It is apparent from an inspection of Figure 5 that the pulley end of the compressor moves very little as compared to the end of the compressor opposite from the pulley. This is due to the fact that the shear type resilient mounts 54 and 56 permit limited lateral movement of the end of the compressor opposite the pulley, while the relatively stiff rubber ring 38 substantially prevents lateral movement of the pulley end of the compressor. This arrangement has the great advantage of maintaining a substantially constant belt tension on the belt 34 as the pulley 26 does not move to any great extent with respect to the driving pulley 32 connected with engine 28. The shock absorbing mounting of this invention compensates for the internal forces generated by the compressor and also reduces road shock that would be transferred from the motor vehicle to the compressor, if it were not for the resilient mounting arrangement. It has been found that the resilient mounting of this invention substantially entirely prevents the transmission of vibration from the compressor to the motor vehicle, thereby reducing undesirable noise that would be set up if the resilient mounting were not used.

While the form of embodiment of the invention as herein disclosed constitutes a preferred form, it is to be understood that other forms might be adopted, as may come within the scope of the claims which follow.

What is claimed is as follows:

1. A shock absorbing mounting arrangement for a rotary machine having a driving pulley at one end thereof comprising, an annular resilient member engaging said machine at a point located between said pulley and the center of gravity of said machine, means connecting said resilient member with a support, said resilient member forming a shock absorbing connection between said machine and said support, a resilient block having an adjacent end thereof secured to said machine at an end of said machine opposite from said pulley and extending axially of said machine, and means connecting the end of said block opposite from said machine with said support to provide a shear type supporting arrangement.

2. A shock absorbing mounting arrangement for a rotary machine having a driving pulley at one end thereof comprising, a resilient annular ring engaging said machine at a point located between said pulley and the center of gravity of said machine, clamp means for holding said ring in tight engagement with said machine, means connecting said clamp means with a support whereby said machine is mounted in fixed relation to said support, and resilient means connected to said machine at a point spaced from said pulley and connected in a shear type supporting arrangement to said support, said resilient means permitting limited lateral movement of the end of said machine opposite from said pulley, said resilient ring preventing substantially all lateral movement of the pulley end of said machine and preventing torsional oscillation of said machine.

3. A shock absorbing mounting for resiliently mounting a refrigerant compressor of the type having a driving pulley at one end thereof on a motor vehicle comprising, an annular resilient ring tightly engaging said compressor adjacent said pulley to prevent torsional oscillation of said compressor, means connecting said ring with said motor vehicle, and a resilient member interposed in a shear type supporting arrangement between an end of said compressor opposite from said pulley and said motor vehicle, said resilient ring preventing substantially all lateral movement of the pulley end of said machine, said resilient member permitting limited lateral movement of the end of said machine in all directions generally perpendicular to the axis of the pulley opposite said pulley end.

4. A mounting arrangement for a compressor of a wobble plate type having a driving pulley at one end thereof comprising, an annular ring of rubber encircling an end portion of said compressor and located adjacent said pulley, clamp means engaging said rubber ring for holding said ring in tight engagement with said compressor to prevent torsional oscillation of said compressor, a bracket secured between said clamp means and a support whereby the pulley end of the compressor is restrained from lateral movement with respect to said support, a second bracket secured to said support, and a rubber shock absorbing member connected in a shear type supporting arrangement between said second bracket and an end of said compressor opposite from the pulley end, said rubber ring preventing substantially all lateral movement of the pulley end of said compressor and preventing rotational movement of said compressor, said rubber member permitting limited lateral movement of the end of said compressor opposite from said pulley end.

References Cited in the file of this patent

UNITED STATES PATENTS

| | | |
|---|---|---|
| 2,089,383 | Koerner | Aug. 10, 1937 |
| 2,209,477 | Reibel | July 30, 1940 |
| 2,217,351 | Soderquist | Oct. 8, 1940 |
| 2,361,529 | Briggs | Oct. 31, 1944 |